(12) United States Patent
Litke

(10) Patent No.: US 8,458,816 B2
(45) Date of Patent: Jun. 11, 2013

(54) SPORT GLOVE WITH A CABLE TIGHTENING SYSTEM

(75) Inventor: Kenneth S. Litke, Marion, MA (US)

(73) Assignee: Acushnet Company, Fairhaven, MA (US)

( * ) Notice: Subject to any disclaimer, the term of this patent is extended or adjusted under 35 U.S.C. 154(b) by 573 days.

(21) Appl. No.: 12/351,106

(22) Filed: Jan. 9, 2009

(65) Prior Publication Data

US 2010/0175163 A1   Jul. 15, 2010

(51) Int. Cl.
A63B 71/14   (2006.01)

(52) U.S. Cl.
USPC ............................................ 2/161.4; 2/161.2

(58) Field of Classification Search
USPC ............ 2/158, 159, 160, 161.1, 161.4, 161.6, 2/162, 161.2, 910, 917; 24/712
See application file for complete search history.

(56) References Cited

U.S. PATENT DOCUMENTS

| | | | | |
|---|---|---|---|---|
| 90,348 A * | 5/1869 | Deschamps | ...................... | 24/323 |
| 251,272 A * | 12/1881 | Moller | ........................... | 24/68 R |
| 373,470 A * | 11/1887 | Morrison | .......................... | 2/162 |
| 413,399 A * | 10/1889 | Jackman | ........................ | 24/68 R |
| 774,381 A * | 11/1904 | Dyke | ........................... | 24/714.6 |
| 826,238 A * | 7/1906 | Gerhard | ............................ | 2/158 |
| 1,021,238 A * | 3/1912 | Churchill | ....................... | 2/161.6 |
| 1,358,647 A * | 11/1920 | Moon | .............................. | 24/712 |
| 1,450,918 A * | 4/1923 | Graff | .............................. | 24/712 |
| 1,606,325 A * | 11/1926 | Steinberger | ....................... | 2/162 |
| 1,900,395 A * | 3/1933 | Gitt | .................................... | 2/19 |
| 2,085,467 A * | 6/1937 | Lipton | ............................. | 2/162 |
| 2,113,731 A * | 4/1938 | Kennedy | ...................... | 24/713.2 |
| 3,147,526 A * | 9/1964 | Winson | ......................... | 24/68 R |
| 4,042,977 A * | 8/1977 | Antonious | ..................... | 2/161.5 |
| 4,414,761 A * | 11/1983 | Mahood | .......................... | 36/50.1 |
| 5,027,482 A * | 7/1991 | Torppey | .......................... | 36/50.1 |
| 5,079,776 A * | 1/1992 | Crawford | ............................ | 2/20 |
| 5,197,149 A * | 3/1993 | Overton | .......................... | 2/162 |
| 5,263,202 A * | 11/1993 | Siberell | ............................ | 2/336 |
| 5,375,263 A * | 12/1994 | Cuccia | ............................. | 2/158 |
| 5,444,874 A * | 8/1995 | Samelian et al. | ................. | 2/159 |
| 7,065,906 B2 * | 6/2006 | Jones et al. | .................... | 36/50.1 |
| 7,275,267 B2 * | 10/2007 | Thiruppathi | ................... | 2/161.1 |
| 2004/0134099 A1 * | 7/2004 | Jones et al. | .................... | 36/50.1 |

* cited by examiner

*Primary Examiner* — Khoa Huynh
*Assistant Examiner* — Sally Haden
(74) *Attorney, Agent, or Firm* — Daniel W Sullivan

(57) ABSTRACT

The present invention concerns a glove 10, including fingers 12, a thumb 14, and a back surface 24 having a lateral portion 28 and a medial portion 30, a tightening system 18, and a closure assembly 40. Closure assembly 40 opens to allow the wearer's hand ingress and egress. Glove 10 is tightened around the wearer's hand using tightening system 18, which includes a lace 32, a lace guide 34, and a tightening mechanism 36. Lace 32 is threaded through lace guide 34 positioned opposite tightening mechanism 36 on back surface 24 and attached at opposite ends to tightening mechanism 36. In an advantageous aspect of the present invention, lace 32 is tensioned to draw lace guide 34 toward tightening mechanism 36, which tightens glove 10 around the wearer's hand.

6 Claims, 2 Drawing Sheets

SPORT GLOVE WITH A CABLE TIGHTENING SYSTEM

FIELD OF THE INVENTION

The present invention relates generally to sport gloves, and more specifically, to golf gloves with a cable tightening system.

BACKGROUND OF THE INVENTION

With respect to athletic gloves, such as those used in golf, it is important that a glove fit properly and be firmly secured about the wearer's hand to ensure that the glove does not interfere with the feel of a sports instrument in the wearer's hand. While adequate sizing plays a role in ensuring proper fit, a glove must also initially be loose enough to allow the wearer's hand ingress and egress. Thus, to ensure proper fit, there must be a way to tighten the glove after it has been placed over the wearer's hand.

There currently exist a number of mechanisms and methods for tightening gloves around a wearer's hand. Such mechanisms include buckles, straps, buttons, ties, elastic, pull closures, hook and loop systems, cable systems and others. While these mechanisms allow gloves to be tightened, they generally have limited range, are difficult to adjust and operate one-handed, and/or have durability constraints. Buckles or straps, such as those disclosed in U.S. Pat. No. 4,042,977 for example, can be difficult to operate one-handed, as is often required when tightening a glove on to the wearer's other hand. Buttons, such as that in U.S. Pat. No. 1,083,795, are not only difficult to operate one-handed, but also are limited in the range of tightening that they can accomplish. Ties, such as that in U.S. Pat. No. 4,295,299, can be extremely difficult to tie one-handed, and, like buckles, have a very limited range over which they can tighten the glove. Elastic portions, such as those discussed in U.S. Patent Application Publication No. 2007/0000019, allow gloves to stretch to allow ingress and egress and then contract to hold the glove in place, and are easy to operate one-handed. However, they can stretch over time, such that they do not maintain a tight fit, and are limited in their ability to create tension around the wearer's hand for a truly snug fit. Pull closures, such as that disclosed in U.S. Pat. No. 5,263,202, allow an elastic strap to be pulled tight, but generally leave excess elastic cord hanging free, which is undesirable in an athletic glove. Lastly, hook and loop closures, often marketed as Velcro®, such as that disclosed in U.S. Pat. No. 4,701,963, can become clogged with other fibers or dirt, and can be difficult to pull tight with a single hand. Cable systems, such as that disclosed in U.S. Pat. No. 5,647,104, can be difficult to operate one-handed in the same manner as hook and loop closures.

Accordingly, there is a need for an improved glove fastening and tightening system.

SUMMARY OF THE INVENTION

The present invention is directed to a glove including a cable tightening system. The cable tightening system includes a tightening mechanism, a lace guide, and a lace threading between the tightening mechanism and the lace guide. The tightening mechanism is capable of at least partially retracting the lace and thereby advancing the lace guide toward the tightening mechanism to tighten the glove.

The present invention is further directed to a glove including a cable tightening system wherein the cable tightening system is disposed on a flap engagable to the back of the glove.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE INVENTION

The present invention is directed to a glove comprising a cable tightening system. Particularly, the present invention is directed to a glove comprising a cable tightening system that is easily operable with one hand. The inventive glove has an adjustable range and an adjustable snug fit, and is very durable.

U.S. Pat. Nos. 5,934,599, 6,202,953, and 6,289,558 to Hammerslag (the "Hammerslag Patents"), which are incorporated herein by reference in their entireties, disclose a cable lacing system for a shoe that automatically distributes lateral tightening forces along the length of the wearer's ankle and foot. More particularly, the Hammerslag Patents describe a circular tightening apparatus that is rotated to tighten stainless steel wire/strands coated with friction-reducing polymers and locked in place with a ratchet and pawl lock. The polymer coated stainless steel wire is threaded through the eyelets around the ankle and is connected at both ends to the tightening apparatus. The stainless steel laces are loosened when the lock is released by lifting the pawl and pulling on the laces to loosen them, or using reverse rotation of the ratchet. This lacing system is known commercially as the BOA™ system, and has been incorporated into various types of footwear, including golf shoes, ice skates, boots, and others. Such systems are fully disclosed in co-owned co-pending U.S. patent application Ser. No. 12/029,584 entitled "Shoes with Shank and Heel Wrap," filed on Feb. 12, 2008, which is hereby incorporated by reference herein in its entirety. Similar lacing systems have also been incorporated into exercise belts and helmets.

The present invention integrates the cable tightening mechanism from a Hammerslag lacing system onto a modified sport glove. While the present invention is discussed in connection with sport gloves, e.g., baseball, racquetball or golf gloves, it is understood that the inventive cable tightening system can be used in any type of glove requiring a tightening or closure system.

Figure 1B:
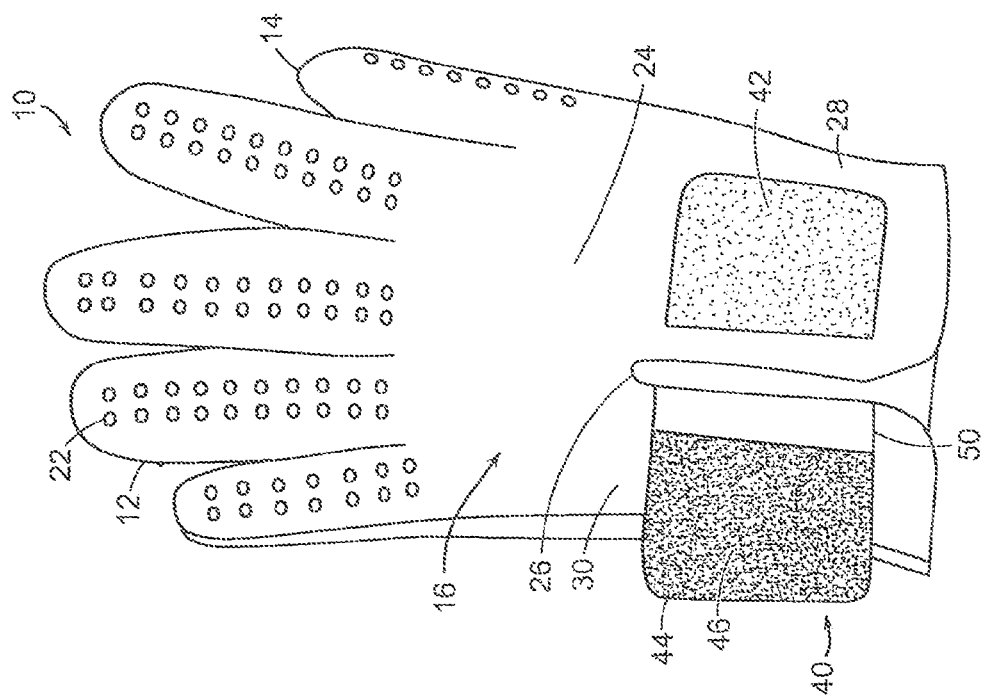
FIG. 1B is a back view of the golf glove of FIG. 1A wherein the hook and loop closure is open.
Figure 1A:
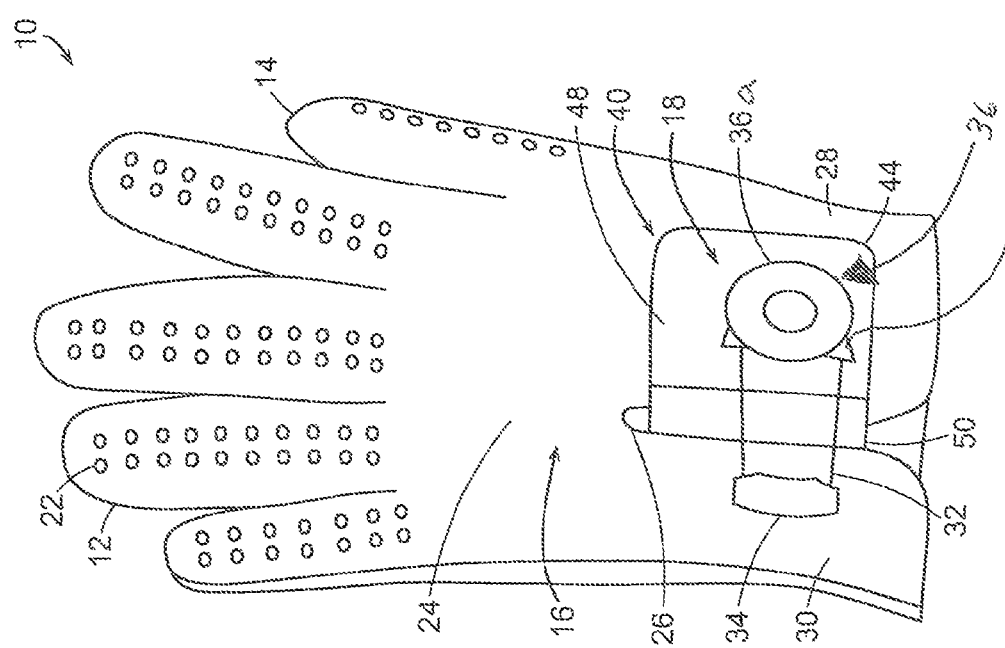
FIG. 1A is a back view of an embodiment of an inventive golf glove incorporating a cable tightening system.

FIG. 1A illustrates a golf glove 10 of the type worn by golfers and baseball or racquetball players to ensure a firm grip on a club, bat, or racquet handle. Like conventional sport gloves, glove 10 includes fingers 12, a thumb 14, and a body 16. Glove 10 also includes cable tightening system 18 and a modified glove closure assembly 40, discussed below. Glove 10 can also be a ½ and ¾ fingered glove.

In more detail, glove 10 is of flexible construction, preferably comprising leather, or synthetic leather including but not limited to polyurethane leather (e.g., polyurethane coated nylon), or nonwoven material, and can be perforated with ventilation holes 22 on the back surface of fingers 12. Glove body 16 includes a front surface (not shown), and a dorsal, back surface 24 which is divided by an opening 26 into a lateral portion 28 adjacent the thumb 14 and a medial portion 30. Opening 26 may optionally be filled with an elastic material or fabric.

Cable tightening system 18 includes a lace 32 threaded over a lace guide 34 and a tightening mechanism 36. In this embodiment, lace guide 34 has a channel having generally semi-circular shape and a width sufficient to allow lace 32 to slide freely through the channel. Preferably, lace 32 is threaded through lace guide 34, and may not be easily removed therefrom. In such an embodiment, lace guide 34 has a generally semi-circular shaped tube through which lace 32 is threaded. The semi-circular tube has a diameter sufficient to allow lace 24 to slide easily through the tube.

A low friction relationship between lace 32 and lace guide 34 greatly facilitates tightening and untightening of cable tightening system 18. Specifically, because lace 32 and lace guide 34 are manufactured or coated with a low friction material, lace 32 slides easily through lace guide 34 without catching. Lace 32 thus automatically distributes tension across its entire length such that tightening pressure is evenly distributed. When the tension in lace 32 is released, lace 32 slides easily through lace guide 34 to release tension and evenly distribute any slack along the length of lace 32.

Lace 32 may be formed from any of a wide variety of polymeric or metal materials or combinations thereof, which exhibit sufficient axial strength and bendability for the present application. For example, any of a wide variety of solid core wires, solid core polymers, or multi-filament wires or polymers, which may be woven, braided, twisted or otherwise oriented, can be used. A solid or multi-filament metal core can be provided with a polymeric coating, such as polytetrafluoroethylene (PTFE) or others known in the art, to reduce friction. In one embodiment, lace 32 comprises a stranded cable, such as a 7 strand by 7 strand cable manufactured of stainless steel. In order to reduce friction between lace 32 and lace guide 34 through which lace 32 slides, the outer surface of lace 32 is preferably coated with a lubricious material, such as nylon or PTFE. Lace 32 can also be a mono-filament line, such as fishing line.

Figure 2:
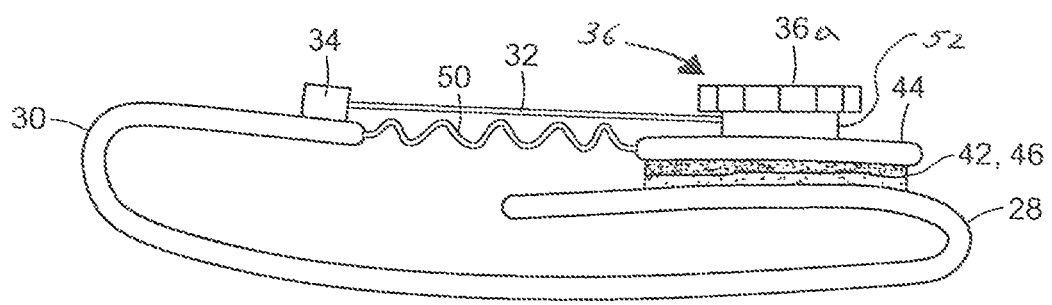
FIG. 2 is an end view of another embodiment of the inventive golf glove.

Referring to FIGS. 1A and 2, tightening mechanism 36 generally comprises a control, such as a lever, crank. or knob (36a), which can be manipulated to retract lace 32 therein or extend lace therefrom. Additionally or alternatively, tightening mechanism 36 may comprise a release such as a button or lever, for disengaging the tightening mechanism to permit lace 32 to be withdrawn therefrom. Tightening mechanism 36 in the illustrated embodiment comprises a housing (52) and a circular knob (36a) rotatably mounted thereto. The knob (36a) may be rotated to wind the ends of lace 32 into the housing (52), and thereby tension lace 32 to reduce slack. As the slack in lace 32 reduces, lace 32 pulls lace guide 34 toward tightening mechanism 36 to tighten glove 10 around the wearer's hand. The knob (36a) may also be counter-rotated to unwind the ends of lace 32 from the housing (52) to increase slack, loosening glove 10 around the wearer's hand. Tightening mechanism 36 may thus be used to provide a customized fit to the wearer.

Tightening mechanism 36 advantageously includes an internal gear mechanism to allow the wearer to easily turn the knob (36a) to retract lace 32. Preferably, the gear mechanism is configured to incrementally pull and retain a predetermined length of lace 32 about a spool as the knob (36a) is rotated. The gear mechanism can be formed having multiple gears with different sized teeth, similar to the gears on a 10-speed or 15-speed bicycles, to allow the gear mechanism to provide relatively coarse or relatively fine control over the tension in lace 32. A user may thus advantageously continuously adjust the tension in lace 32 to a desired comfort and performance level. The knob (36a) is preferably rotated by hand, but may also be rotated through the use of a tool or other mechanism.

Any of a variety of known mechanical structures can be utilized to permit winding of the spool to increase tension on the lace, yet resist unwinding of the spool until desired. For example, any of a wide variety of ratchet structures can be used for this purpose. Alternatively, a Sprague clutch or similar structure will permit one-way rotation of a shaft while resisting rotation in the opposite direction. These and other structures are known to those of ordinary skill in the mechanical arts.

Referring to FIGS. 1A and B, cable tightening system 18 is mounted on an inventive glove closure assembly 40. FIG. 1A illustrates glove 10 with modified glove closure assembly 40 in a closed position and FIG. 1B illustrates glove 10 with modified glove closure assembly 40 in an open position. Glove closure assembly 40 includes a generally rectangular or oval area of fabric loop fastener material 42, attached to lateral back surface 28 by a row of marginal stitching. A generally rectangular or oval flap 44 is coupled with medial portion 30 so as to overlie fastener material 32 in mating engagement when in the closed position. Flap 44 includes an inner surface 46 of fabric hook fastener material and an outer surface 48 joined by stitching. The fabric hook and loop closure system is conventional, and need not be described in great detail. The hook and loop material can be reversed. In other embodiments, snaps, buttons, or any other suitable closure devices may be substituted for fabric loop fastener material or hook and loop fasteners in closure assembly 40. Closure assembly 40 allows a wearer gross or coarse control over the tightness of the glove, while tightening mechanism provides fine control over the tightness of the glove.

In this embodiment, tightening mechanism 36 is preferably mounted on flap 44, and lace guide 34 is mounted on medial portion 30. Thus, when a wearer desires to tighten glove 10, the wearer engages inner surface 46 of flap 44 with fastener material 42. The wearer can then tighten glove 10 by rotating the knob of tightening mechanism 36, pulling lace guide 34 and medial portion 30 closer to tightening mechanism 36. The wearer can also loosen glove 10 by counter-rotating the knob of tightening mechanism 36, to allow lace guide to pull away from tightening mechanism 36.

To avoid material from flap 44 becoming bunched or buckling as cable tightening system 18 is tightened, flap 44 is preferably connected to medial portion 30 with a strip of extendable fabric or material 50. Extendable material 50 is preferably an elastic fabric or material. Alternatively or additionally, portions of, or the entirety of flap 44 could be made from elastic material or fabric. Elastic material 50 is stretchable, and allows flap 44 to be easily pulled over fastener material 42 to fully engage the fabric hook and loop closure system. Then, as cable tightening system 18 is tightened, elastic material 50 can contract without the material of flap 44 bunching or buckling under lace 32.

In other embodiments, as illustrated in FIG. 2, flap 44 may be connected to medial portion 30 with a corrugated or sinusoid shaped portion 50 capable of expanding or compressing without buckling as cable tightening system 18 is tightened. Lace 32 could be threaded through such a corrugated or sinusoid shaped portion to prevent bunching or buckling of the material. In an advantageous aspect, threading lace 32 through the corrugated or sinusoid shaped portion could hide lace 32 from view, providing a cleaner look to the glove.

Either of these embodiments has significant benefits to the wearer. Because at least a portion of flap 44 is capable of expanding or contracting, the user is able to fully engage flap 44 with the lateral portion 28 of the glove without straining against the underlying glove material, which may be non-stretching, in the case of leather, synthetic leather, or other non-woven materials. This is important because if the glove and flap cannot stretch or expand, a wearer can have difficulty ensuring a snug fit due to difficulty pulling the glove material tight using only one hand. In this manner, flap 44 allows the wearer to coarsely control the fit of the glove. After flap 44 is engaged, the tightening of cable tightening system 18 allows the wearer to finely control the fit of the glove by pulling the underlying glove material tight around the wearer's hand; tightening lace 32 pulls lace guide 34 on medial portion 30 toward tightening mechanism 36, which is engaged to lateral portion 28 via closure assembly 40. Likewise, the glove can be loosened by using tightening mechanism 36 to loosen lace 32. This facilitates the convenience to the wearer, by allowing the glove to be easily put on, tightened, loosened, or removed, as necessary. This is especially convenient because it allows the wearer to quickly customize the fit of the glove throughout play. For example, if, initially, a glove is fitting properly, during play it might loosen because the leather stretches, or the wearer might decide they would like the glove looser or tighter. With a traditional glove, the wearer would be required to go through the tightening process from the beginning with all of the difficulties that can entail. Using the inventive system, the wearer can leave closure system 40 engaged and tighten or loosen tightening system 18 as necessary to customize the fit during play.

The combination of tightening system 18 and closure assembly 40 can also be used in other ways. For example, tightening system 18 can be tightened or loosened to allow extendable material 50 to extend to a greater or lesser degree. Thus, if tightening system 18 is loosened, flap 44 can be extended to a greater degree by stretching material 50 to allow glove 10 to accommodate a wearer having larger hands. In another aspect, tightening system 18 can be set to a specific lace tightness, and the wearer may leave tightness at this desired level at all times while using closure system 40 to permit ingress to and egress from glove 10. This allows a wearer to easily approximate the same level of tightness consistently through the use of closure system 40, while still maintaining superior control over the base level of tightness due to the availability of cable tightening system 18. The controls provided by flap 50/extendable material 50 combination and by tightening system 18 can be employed jointly or separately.

The positioning of the cable tightening system 18 on flap 44 and medial portion 30, coupled with inventive closure assembly 40, has at least one other advantage. Because flap 44 optionally covers opening 26 or an elastic portion, as best shown in FIG. 1B, which opens or stretches to allow a wearer's hand ingress and egress, and lace 32 does not extend across opening 26, lace 32 does not need to be unlaced to allow a wearer to put on the glove. Lace 32 can instead be fixedly laced between lace guide 34 and tightening mechanism 36, wherein it is tightened and loosened via tightening mechanism 36. This is beneficial because lacing systems can be difficult to lace one-handed, especially if the wearer's hands are moist or sweaty, a likely occurrence if the wearer is undertaking strenuous activity, such as playing sports. Thus, cable tightening system 18 and closure assembly 40 conveniently allow the wearer to easily put on the glove when it is necessary for improved grip, easily remove the glove when it is unnecessary, or simply adjust the glove, even if the wearer is sweaty from exertion.

It is to be understood that while certain forms of the present invention have been illustrated and described herein, it is not to be limited to the specific forms or arrangement of parts described and shown. An example may be where cable tightening system 18 comprises more than one lace guide 34, or alternatively where a closure assembly other than a fabric hook and loop closure system is used to engage flap 44 to lateral portion 28. This invention is also not to be limited to the specifically preferred embodiments depicted therein.

I claim:

1. A glove comprising:
fingers, a thumb, a back surface comprising a lateral portion adjacent to the thumb and a medial portion, the back surface including an opening that separates the lateral and medial portions;
a closure system releasably connecting the lateral portion to the medial portion, wherein the closure system comprises a flap having a fixed end and a free end, the fixed end being attached to the medial portion and the free end having an interior surface and back surface, the free end interior surface having hook or loop fasteners, wherein the hook or loop fasteners attach to complementary hook or loop fasteners on the back surface of the lateral portion;
and a tightening system connected to the closure system mechanism, wherein the tightening system comprises a housing and a circular knob rotatably mounted thereto, a first lace guide, and a lace that is threaded between the knob and the lace guide, the housing being attached directly to the free end back surface of the flap and the lace guide being attached to the medial back portion of the glove, wherein the knob is rotated to wind the lace into the housing, thereby tightening the glove; and the knob is counter-rotated to unwind the lace from the housing, thereby loosening the glove.

2. The glove of claim 1, wherein the flap comprises an elastic material.

3. The glove of claim 1, wherein the hook fasteners are attached to the free end interior surface of the flap and the loop fasteners are attached to the back surface of the lateral portion of the glove.

4. The glove of claim 1, wherein the loop fasteners are attached to the free end interior surface of the flap and the hook fasteners are attached to the back surface of the lateral portion of the glove.

5. The glove of claim 1, wherein the flap is connected to the medial portion by a corrugated or sinusoid shaped portion.

6. The glove of claim 5, wherein the lace is threaded through the corrugated or sinusoid shaped portion.

\* \* \* \* \*